(12) United States Patent
Sunwoo

(10) Patent No.: US 7,164,723 B2
(45) Date of Patent: Jan. 16, 2007

(54) MODULATION APPARATUS USING MIXED-RADIX FAST FOURIER TRANSFORM

(75) Inventor: Myung-Hoon Sunwoo, Suwon-shi (KR)

(73) Assignees: Samsung Electronics Co., Ltd. (KR); AJOU University Industry Cooperation Foundation (KR)

( * ) Notice: Subject to any disclaimer, the term of this patent is extended or adjusted under 35 U.S.C. 154(b) by 740 days.

(21) Appl. No.: 10/608,511

(22) Filed: Jun. 27, 2003

(65) Prior Publication Data

US 2004/0001557 A1 Jan. 1, 2004

(30) Foreign Application Priority Data

Jun. 27, 2002 (KR) .................. 10-2002-0036216
Jun. 27, 2003 (KR) .................. 10-2003-0042357

(51) Int. Cl.
*H04K 1/10* (2006.01)
*G06F 17/14* (2006.01)

(52) U.S. Cl. .................. 375/260; 708/408; 708/409

(58) Field of Classification Search ................ 375/260, 375/295, 340; 370/210; 382/280; 708/403–405, 708/408, 409, 821
See application file for complete search history.

(56) References Cited

U.S. PATENT DOCUMENTS

| | | | | |
|---|---|---|---|---|
| 2003/0076904 A1* | 4/2003 | Magee | ....................... | 375/340 |
| 2003/0169823 A1* | 9/2003 | Reina | ....................... | 375/260 |
| 2004/0042387 A1* | 3/2004 | Geile | ....................... | 370/206 |
| 2004/0199557 A1* | 10/2004 | Reshef | ....................... | 708/207 |
| 2005/0102342 A1* | 5/2005 | Greene | ....................... | 708/409 |

* cited by examiner

*Primary Examiner*—Don N. Vo
(74) *Attorney, Agent, or Firm*—The Farrell Law Firm

(57) ABSTRACT

An FFT (Fast Fourier Transform) processor is disclosed which is a core block of an OFDM (Orthogonal Frequency Division Multiplexing) or DMT (Discrete Multi-tone) MODEM. The FFT processor simultaneously performs sequential input and output by applying an in-place algorithm for a mixed-radix multi-bank memory, thereby realizing continuous processing with only a 2N-word memory having 4 banks. The FFT processor minimizes its complexity while satisfying a high-speed calculation requirement.

11 Claims, 16 Drawing Sheets

MODULATION APPARATUS USING MIXED-RADIX FAST FOURIER TRANSFORM

This application claims priority under 35 U.S.C. § 119 to an application entitled "Modulation Apparatus Using Mixed-Radix Fast Fourier Transform" filed in the Korean Intellectual Property Office on Jun. 27, 2002 and assigned Serial No. 2002-36216, the contents of which are incorporated herein by reference; and to an application filed in the Korean Intellectual Property Office on Jun. 27, 2003 and assigned Serial No. 2003-42357, the contents of which are incorporated herein by reference.

BACKGROUND OF THE INVENTION

1. Field of the Invention

The present invention relates generally to an apparatus for modulating data, and in particular, to a modulation apparatus based on orthogonal frequency division multiplexing (hereinafter referred to as "OFDM") technology or discrete multi-tone (hereinafter referred to as "DMT") technology.

2. Description of the Related Art

Generally, in a digital data communication system, data is modulated before being transmitted and demodulated after being received. Such modulation and demodulation are performed by a MODEM (modulator-demodulator) whose structure may vary according to its modulation scheme. Typically, modulation schemes used for data communication include code division multiplexing (CDM), frequency division multiplexing (FDM), OFDM, and DMT schemes.

A description will now be made of the OFDM and DMT modulation schemes herein below.

The OFDM scheme has been proposed for high-speed data transmission over a multi-path channel in a wireless communication system. Before the OFDM scheme had been proposed, a single carrier transmission scheme was used for data transmission. That is, a wireless communication system, using a modulation scheme preceding the OFDM scheme, modulates serial transmission data and then transmits each modulated symbol by using the entire frequency band of the channel. The OFDM scheme or the DMT scheme serial-to-parallel-coverts modulated data into as many data symbols as the number of subcarriers, and modulates the converted data symbols with corresponding subcarriers. Such modulation using subcarriers is realized by using a discrete Fourier transform (hereinafter referred to as "DFT"). However, for actual hardware design, modulation using subcarriers is realized by using a fast Fourier transform (hereinafter referred to as "FFT") algorithm rather than a DFT or inverse discrete Fourier transform (hereinafter referred to as "IDFT") algorithm, in order to reduce the number of calculations (or operations). A processor for processing the FFT algorithm has a high complexity and requires high-speed calculation when it is applied to an OFDM system. Therefore, it is hard to realize the processor for processing the FFT algorithm.

An FFT processor having a pipe line structure is chiefly used in a field where high-speed calculation is required. However, the pipe line structure requires as many calculators as the number of stages, so an increase in number of points causes an increase in its hardware size. Therefore, in order to solve the problems associated with an increase in hardware size, processors using a memory structure and a single butterfly calculator have been introduced.

A memory-based FFT processor using a radix-2 FFT algorithm is a typical example of such processors. Since the memory-based FFT processor can apply the radix-2 algorithm to a memory structure, it can minimize the number of multipliers. Therefore, the memory-based FFT processor can be used in realizing a small-sized FFT processor.

However, the memory-based FFT processor using the radix-2 algorithm requires many calculation cycles, increasing a calculation time. Therefore, the memory-based radix-2 FFT processor is not suitable to an OFDM system or DMT system which requires high-speed calculation, and in order to satisfy the high-speed calculation requirement, the memory-based radix-2 FFT processor requires a very high operating frequency. Thus, in the OFDM system or DMT system, a radix-4 algorithm is generally used instead of the radix-2 algorithm. A description will now be made of an existing FFT processor based on the radix-4 algorithm.

FIG. 1 is a block diagram illustrating a radix-4 algorithm-based FFT processor introduced by Amphion Co. Compared with the radix-2 algorithm, the radix-4 algorithm halves the number of stages, and also halves the number of butterfly calculations per stage. Therefore, the radix-4 algorithm is much smaller than the radix-2 algorithm in number of butterfly calculations. Shown in Table 1 below is the number of calculations of the radix-2 algorithm, the radix-4 algorithm and a mixed-radix algorithm which will described later, according to an FFT length.

TABLE 1

| FFT length | Radix-2 | Radix-4 | Mixed-radix |
|---|---|---|---|
| 256 | 1,024 | 256 | — |
| 512 | 2,304 | — | 640 |
| 1,024 | 5,120 | 1,280 | — |
| 2,048 | 11,264 | — | 3,072 |
| 4,096 | 24,576 | 6,144 | — |
| 8,192 | 53,248 | — | 14,336 |

As illustrated in Table 1, the radix-4 algorithm is available for FFT calculation for only FFT lengths of $4^n$ (where n is an integer), while the radix-2 algorithm is available for FFT calculation for all FFT lengths of $2^n$. For example, for an FFT length 256 which is $2^8$ ($256=2^8$), both the radix-2 algorithm and the radix-4 algorithm can perform FFT calculation. However, for an FFT length 512 which is $2^9$ ($512=2^9$), the radix-4 algorithm cannot perform FFT calculation while the radix-2 algorithm can perform FFT calculation. Therefore, in order to perform FFT calculation for all FFT lengths of $2^n$, a mixed-radix algorithm that uses the radix-4 algorithm together with another radix algorithm is required. The last column of Table 1 shows the number of butterfly calculations when a mixed-radix algorithm is used which mixedly uses the radix-4 algorithm and the radix-2 algorithm. The number of calculations performed by the mixed-radix algorithm of Table 1 is equal to the number of calculations performed by the FFT processor provided by Amphion Co. The FFT processor manufactured by Amphion Co. will now be described with reference to FIG. 1.

Referring to FIG. 1, the FFT processor using the mixed-radix algorithm performs mixed-radix calculations of radix-4, radix-8 and radix-16 calculations by selectively operating a radix-4 butterfly and a radix-4/radix-2 butterfly. An input/output interface and controller 11 performs FFT calculation on input data X received from the exterior, and outputs FFT calculation result data Y to the exterior of the FFT processor. The input data X and the output data Y of the input/output interface and controller 11 can become an OFDM symbol or a DMT symbol. A memory controller 12 controls address generation for a memory 13 in order to read and write data in calculation and data for FFT calculation received from the input/output interface and controller 11. The memory 13 is realized with a 1024-word dual port memory, and reads or writes data received from the exterior and intermediate data and result data of FFT calculation in an address designated by the memory controller 12.

A butterfly calculator 10 is comprised of a radix-4 butterfly 14, a rotation factor look-up datable (hereinafter referred to as "LUT") 16, and a complex multiplier 15. The radix-4 butterfly 14 performs addition and subtraction calculations among radix-4 butterfly calculations. The rotation factor LUT 16 is a memory table for storing a rotation factor of data in calculation and outputting a rotation factor value. The complex multiplier 15 performs complex multiplication among the radix-4 butterfly calculations, and generates the complex multiplication result value. A radix-4/radix-2 selective butterfly 17 selectively performs final calculation according to an FFT length. For example, when radix-2 calculation is required for the final calculation according to an FFT length, the radix-2 butterfly is selected to perform the radix-2 calculation. However, when a radix-4 calculation is required for the final calculation, the radix-4 butterfly is selected to perform the radix-4 calculation. As a result, radix-8 calculation or radix-16 calculation can be performed by connecting the entire FFT calculation with the radix-4 butterfly calculation of the butterfly calculator 10. Therefore, the FFT processor includes a multiplexer (MUX) 18 for selecting the radix-4/radix-2 selective butterfly 17 only in the final stage and selecting the radix-4 butterfly calculator 10 in the other stages. The radix-4 algorithm is realized with a butterfly having 4 inputs and 4 outputs. Therefore, the 4 inputs and 4 outputs must be performed for one cycle in order to minimize the number of calculation cycles. In order to perform the 4 inputs and 4 outputs for one cycle, a memory must be divided into multiple banks. However, the FFT processor of FIG. 1 does not have a multi-bank structure. Therefore, the FFT processor of FIG. 1 requires many calculation cycles, failing to take advantage of the radix-4 calculation.

FIG. 2 is a block diagram illustrating an FFT processor having a mixed-radix algorithm and a multi-bank structure, introduced by Drey Enterprise Co. As illustrated in FIG. 2, the FFT processor introduced by Drey Enterprise Co. also has a memory structure. In the FFT processor of FIG. 2, while one of two input memories (RAMs) 21 and 22 stores input data from the exterior, the other input RAM is used for FFT calculation. A MUX 23 determines whether it will receive a butterfly input from one of the input RAMs 21 and 22, or receive a butterfly input from one of output RAMs 28 and 29. Radix-2 calculators 26 and 27 each perform radix-2 calculation in a radix-2 calculation stage, and generate the radix-2 calculation result. A MUX 24 multiplexes the radix-2 calculation result values received from the radix-2 calculators 26 and 27 in order to write the radix-2 calculation result values in any one of the input RAMs 21 and 22 or any one of the output RAMs 28 and 29. A radix-2/radix-4 common calculator 25 performs radix-4 calculation in a radix-4 calculation stage, and performs radix-2 calculation in a radix-2 calculation stage. While one of the two output RAMs 28 and 29 is used for FFT calculation, the other RAM outputs FFT calculation result data to the exterior. The structure of FIG. 2 uses a mixed-radix algorithm of the radix-4 and radix-2 algorithms, and also uses a multi-bank memory structure. The use of the multi-bank memory structure contributes to minimization of a calculation clock cycle.

However, the structure of FIG. 2 fails to apply an in-place algorithm that writes a butterfly output in a memory location where a butterfly input was accessed. Therefore, the structure of FIG. 2 uses two N-word memories for FFT calculation. That is, for only the FFT calculation, only two four-bank memories are required. However, in order to perform continuous processing, two more four-bank memories must be used for input and output. Therefore, in FIG. 2, a total of 4 memories are used. A memory is one of the blocks that occupies the most area of an FFT processor. Therefore, an increase in number of memories causes an increase in memory complexity, a hardware size and the cost of the FFT processor.

FIG. 3 illustrates a 16-point FFT of an in-place algorithm introduced by L. G. Johnson to minimize memory complexity of the memory structures. The in-place algorithm is used when a memory is divided into multiple banks. For radix-4 butterfly calculation, four data symbols must be simultaneously accessed and four butterfly calculation results must be simultaneously written in the accessed positions. For that purpose, a main memory must be divided into 4 banks i.e. bank #0, bank #1, bank #2 and bank #3, and appropriate addressing must be performed so that several data symbols are not simultaneously accessed from one bank. FIG. 3 illustrates in-place memory addressing for a 16-point FFT, in which there is provided a structure for performing first to eighth butterfly calculations. In each butterfly calculation, 4 inputs are picked at a time. Here, the 4 inputs are read from different banks. A description will now be made of the first and second butterfly calculations. In the first butterfly calculation, 4 inputs are read from an address 0 of a bank #0, an address 1 of a bank #1, an address 2 of a bank #2, and an address 3 of a bank #3, and the butterfly calculation result is written in the same addresses of the same banks. In the second butterfly calculation, 4 inputs are read from an address 0 of a bank #1, an address 1 of a bank #2, an address 2 of a bank #3, and an address 3 of a bank #0, and the butterfly calculation result is written in the same positions. In FIG. 3, a bank index i indicating a bank in use can be simply calculated by performing modulo-4 addition on a value determined by dividing data input count bits by 2-bit digits. Since the FFT of FIG. 3 is a 16-point FFT, a 4-bit counter is used in order to count 16 data bits. The 4 bits are divided into 2 high bits and 2 low bits, and a bank index is calculated in a method of performing modulo-4 addition on the 2 high bits and the 2 low bits.

However, the above-mentioned in-place algorithm has been proposed for a fixed-radix system rather than a mixed-radix system. Therefore, the in-place algorithm cannot be applied to the mixed-radix system without modification.

Next, a description will be made of a conventional continuous processing structure. R. Radhouane has proposed a memory-based FFT processor capable of performing continuous processing with only two N-word memories by simultaneously performing input and output in a memory structure. This structure realizes continuous processing in a method of alternately performing DIF (Decimation in Frequency) calculation and DIT (Decimation in Time) calculation based on the fact that when a radix-2 algorithm performs DIF calculation and DIT calculation, its output and input have a bit reverse characteristic. Shown in Table 2 below is a calculation method of a continuous processing structure using two memories.

TABLE 2

| | Memory #1 | | Memory #2 | |
| OFDM symbol | Memory state | FFT-I/O mode | Memory state | FFT-I/O mode |
| --- | --- | --- | --- | --- |
| 0 | C | DIF | I/O | NAT |
| 1 | I/O | BR | C | DIF |
| 2 | C | DIT | I/O | BR |
| 3 | I/O | NAT | C | DIT |

In Table 2, "OFDM symbol" means data corresponding to a length of FFT calculation. For example, in 256-point FFT calculation, one OFDM symbol means 256 data bits. In Table 2, "C" means FFT calculation, and "I/O" means that input/output is performed. Further, "NAT" means that input/output is performed by performing memory addressing in a correct order of addresses $0, 1, 2, 3, \ldots, N-1$, and "BR" means that memory input/output is performed by bit reverse addressing. In addition, in a $0^{th}$ OFDM symbol of Table 2, a memory #1 performs calculation by DIF, while a memory #2 performs input/output by performing NAT, i.e., memory addressing in a correct order. Next, in a $1^{st}$ OFDM symbol, the memory #1 performs input/output by BR, i.e., bit reverse addressing, while the memory #2 performs calculation by DIF. In a $2^{nd}$ OFDM symbol, the memory #1 performs calculation by DIT, while the memory #2 performs input/output by BR, i.e., bit reverse addressing. Next, in a $3^{rd}$ OFDM symbol, the memory #1 performs input/output by NAT, i.e., memory addressing in a correct order, while the memory #2 performs calculation by DIT. From the next $4^{th}$ OFDM symbol, a series of the calculations on the $0^{th}$ to $3^{rd}$ OFDM symbols is repeated. In order to perform continuous processing with two memories, while one memory performs calculation, the other memory must be able to simultaneously perform input and output having a sequential order. In this structure, the continuous processing can be performed with only two memories such that the two memories alternately perform input/output and FFT calculation.

While a conventional structure introduced by Alcatel Co. realizes continuous processing by using three memories, the above conventional continuous processing structure can minimize memory complexity by using only two memories.

However, the above continuous processing structure was designed for only the case where a radix-2 algorithm is used. Since the continuous processing structure performs only radix-2 calculation, it disadvantageously requires many calculation cycles and a high operating frequency.

SUMMARY OF THE INVENTION

It is, therefore, an object of the present invention to provide an FFT processor capable of minimizing its size and satisfying a high-performance requirement by providing high-speed calculation and a circuit having minimized complexity.

It is another object of the present invention to provide an FFT processor capable of reducing its size and complexity while providing a mixed-radix algorithm of radix-2 and radix-4 algorithms.

It is further another object of the present invention to provide an FFT processor capable of performing fast processing while providing a mixed-radix algorithm of radix-2 and radix-4 algorithms.

It is yet another object of the present invention to provide an FFT processor capable of performing continuous processing while providing a mixed-radix algorithm of radix-2 and radix-4 algorithms.

To achieve the above and other objects, the invention provides a modulation apparatus using a mixed-radix fast Fourier transform (FFT), comprising an input/output interface for selecting a memory for input/output among memories for input/output and FFT calculation, selecting one of four banks of the selected memory, and performing input and output on the selected bank; two N-word memories each having four banks used for input/output to the input/output interface and FFT calculation; a first data exchange for selecting a memory for FFT calculation among the memories for input/output to the input/output interface and FFT calculation, and connecting banks assigned to each butterfly input/output to 4 inputs of a butterfly calculation circuit for in-place calculation; a butterfly for performing a radix-4 butterfly and a radix-2 butterfly provided from the first data exchange with one circuit, and forming a symmetric reverse output; a second data exchange for selecting a memory for FFT calculation among the memories for input/output to the input/output interface and FFT calculation, and connecting banks assigned to each butterfly input/output to four outputs of a butterfly calculation circuit for in-place calculation; and an address generator for generating a bank index and an address for performing in-place calculation in a multi-bank memory structure.

In addition, the invention provides a modulation apparatus using a mixed-radix fast Fourier transform (FFT), comprising two memories each having four banks, for writing input symbols or FFT-calculated symbols; a butterfly for performing butterfly calculation in a radix-4 mode or a radix-2 mode according to the number of symbols output from the memories, and outputting the calculated values in a symmetric reverse; a first data exchange for reading one symbol from each bank of one of the memories and outputting the read symbol to the butterfly; a second data exchange for matching calculated symbols output from the butterfly so that the symbols are written in the same addresses as addresses where the symbols were read from the first data exchange; and an address generator for controlling an output of the second data exchange so that when a symbol read from the first data exchange is output through the second data exchange after being calculated, a bank and an address where the symbol was read from the first data exchange are identical to an output bank and an output address of the second data exchange.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Several preferred embodiments of the present invention will now be described in detail with reference to the annexed drawings. In the following description, a detailed description of known functions and configurations incorporated herein has been omitted for conciseness.

Figure 1:
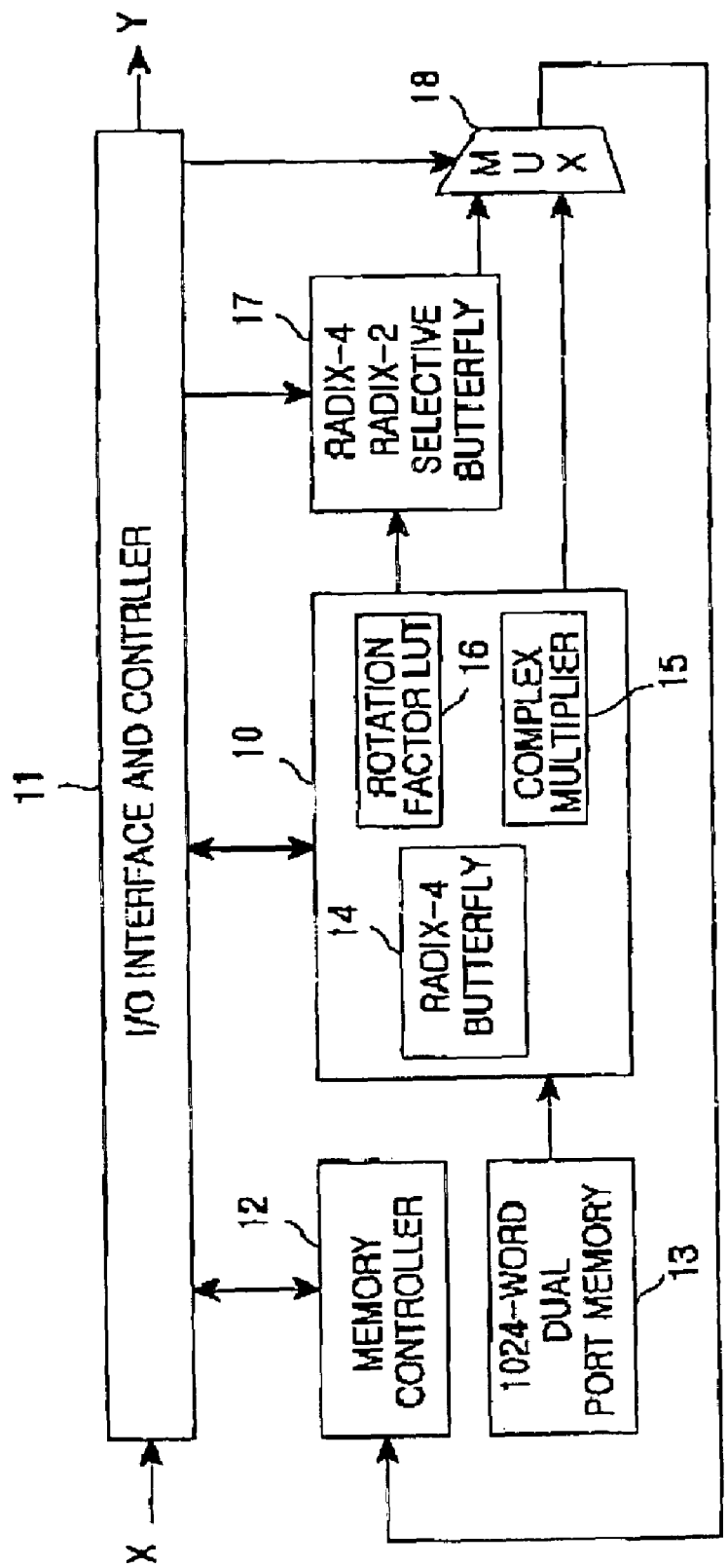
FIG. 1 is a block diagram illustrating a structure of a conventional mixed-radix FFT processor not using a multi-bank structure.
Figure 2:
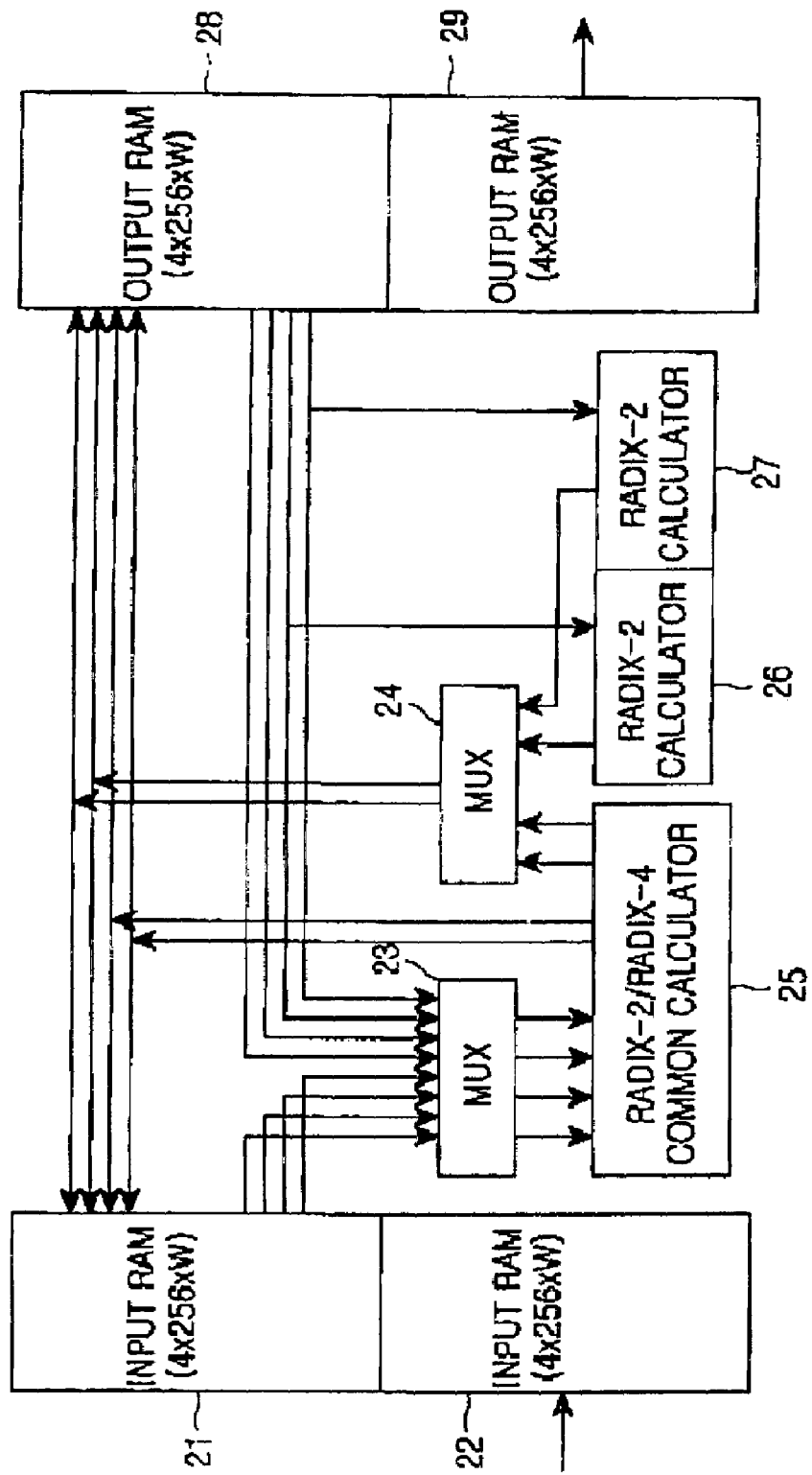
FIG. 2 is a block diagram illustrating a structure of a conventional mixed-radix FFT processor not using an in-place algorithm.
Figure 3:
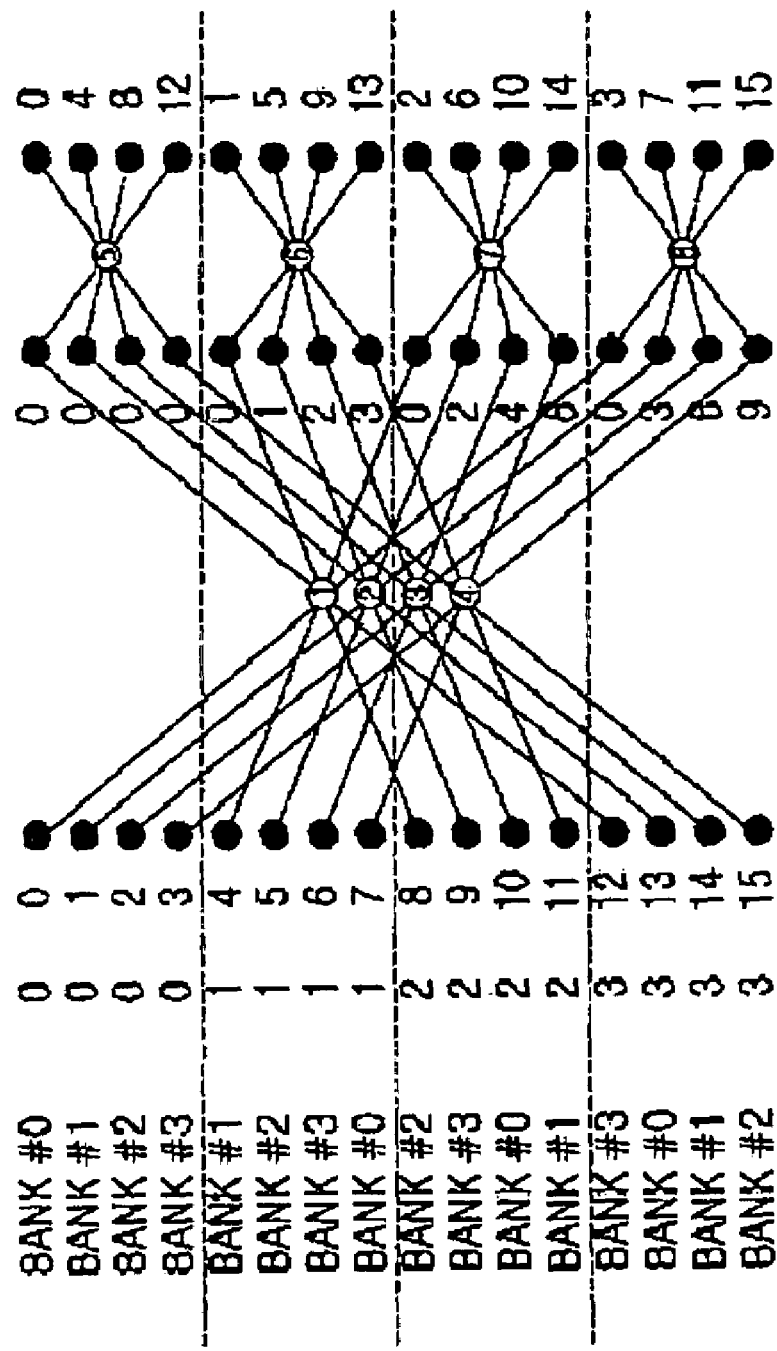
FIG. 3 is a diagram illustrating a radix-4 in-place algorithm for a conventional multi-bank memory.
Figure 4:
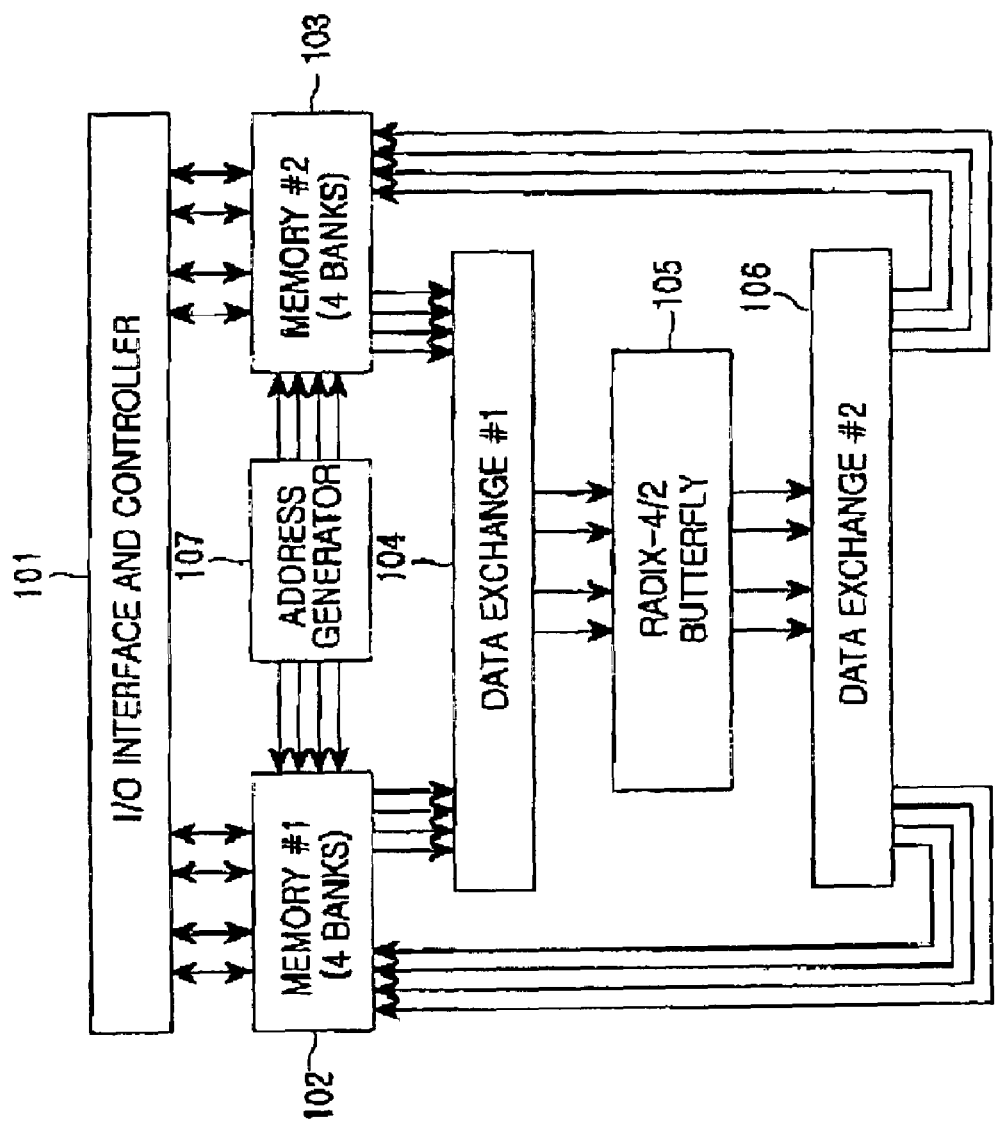
FIG. 4 is a block diagram illustrating a structure of an in-place algorithm-based mixed-radix FFT processor having a continuous processing structure according to an embodiment of the present invention.

FIG. 4 is a block diagram illustrating an FFT processor that performs continuous processing with a 2N-word memory by applying an in-place algorithm and simultaneously performing input and output together with a mixed-radix structure according to an embodiment of the present invention.

Referring to FIG. 4, in order to perform FFT calculation on input data, an input/output interface 101 selects one of memories 102 and 103, selects one of four banks of the selected memory, and writes the input data in the selected bank. When FFT calculation on the input data is completed, the input/output interface 101 selects a memory where the FFT calculated data is written, selects one of four banks of the selected memory, and reads data from the selected bank. The two N-word memories 102 and 103 each having 4 banks write data received from the input/output interface 101, provide the written data to a first data exchange 104 for FFT calculation, and write data received from a second data exchange 106. The FFT calculated data from the memories 102 and 103 is provided to the input/output interface 101. The first data exchange 104 selects a memory and a bank of the memory, where data to be FFT calculated is written, and reads 4 data symbols from the bank of the selected memory for in-place calculation according to the present invention. The first data exchange 104 exchanges the read data according to an address value output from an address generator 107 and provides its output to a radix-4/2 butterfly 105. The radix-4/2 butterfly 105 operates in a radix-4 mode or a radix-2 mode according to data received from the first data exchange 104. The radix-4/2 butterfly 105 is composed of one circuit, and has symmetrical reverse outputs. The data calculated by the radix-4/2 butterfly 105 is provided to the second data exchange 106. The second data exchange 106 selects a memory and a bank of the memory, where a value output from the radix-4/2 butterfly 105 is to be written, and writes the output value in the bank of the selected memory. The address generator 107 generates a bank index and an address for performing in-place calculation according to the present invention in the multi-bank memory structure.

Figure 5:
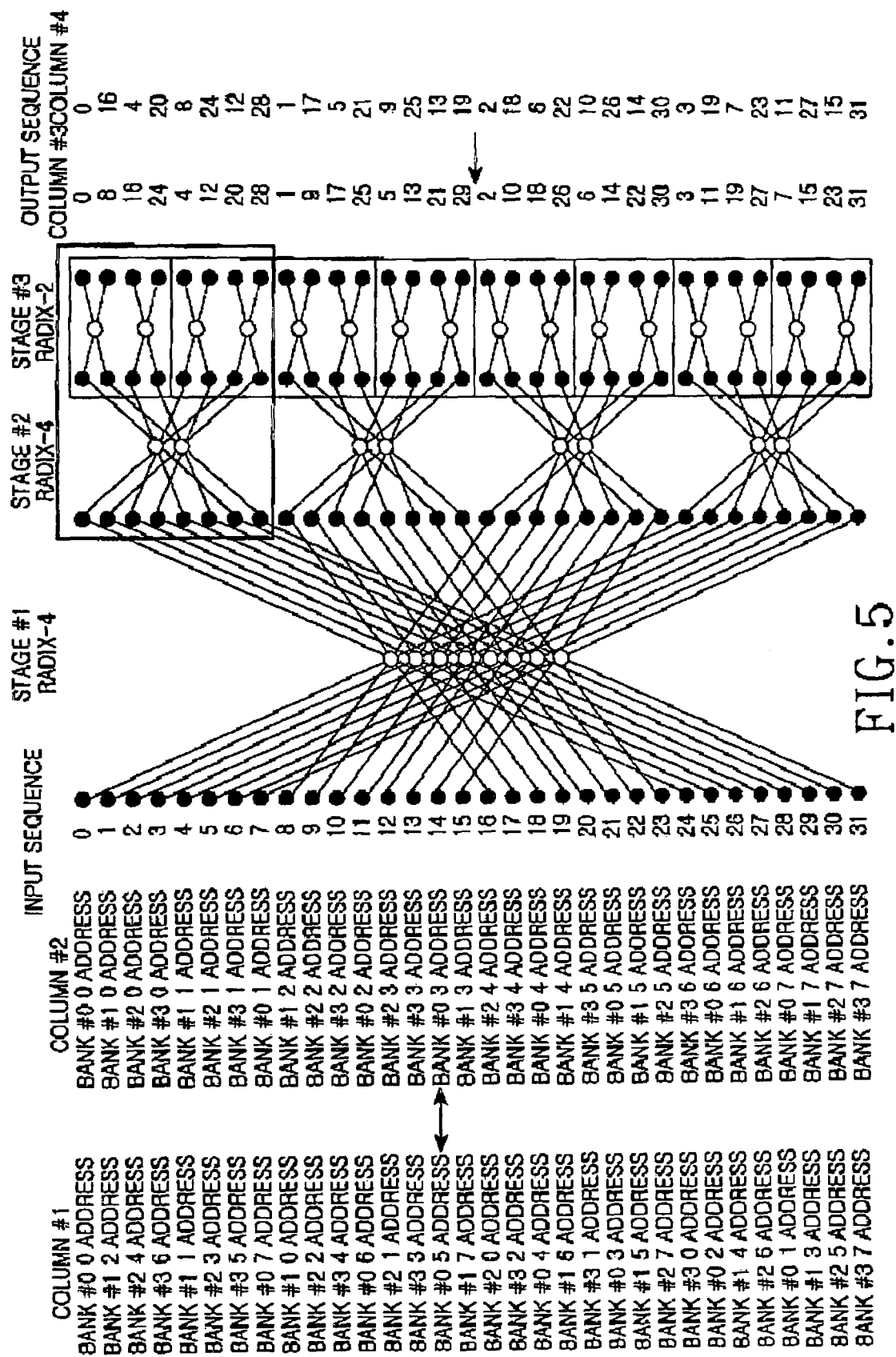
FIG. 5 is a signal flow diagram illustrating calculation of a 32-point mixed-radix FFT processor according to an embodiment of the present invention.

The FFT processor having the structure of FIG. 4 has a signal flow diagram illustrated in FIG. 5. FIG. 5 illustrates an example of a 32-point mixed-radix FFT calculation, wherein a stage #1 and a stage #2 are subject to radix-4 calculation and a final stage #3 is subject to radix-2 calculation. As described in conjunction with FIG. 4, in the structure proposed by the present invention, 2 memories are each divided into 4 banks, so 4 data symbols can be simultaneously accessed. Therefore, a radix-2 butterfly using 2 data symbols can simultaneously perform 2 butterfly calculations. In addition, 2 radix-2 butterflies in the stage #3, shown in boxes drawn by a thin solid line, represent a butterfly pair that can simultaneously perform a butterfly calculation thereby contributing to a reduction in a calculation cycle.

Figure 6A:
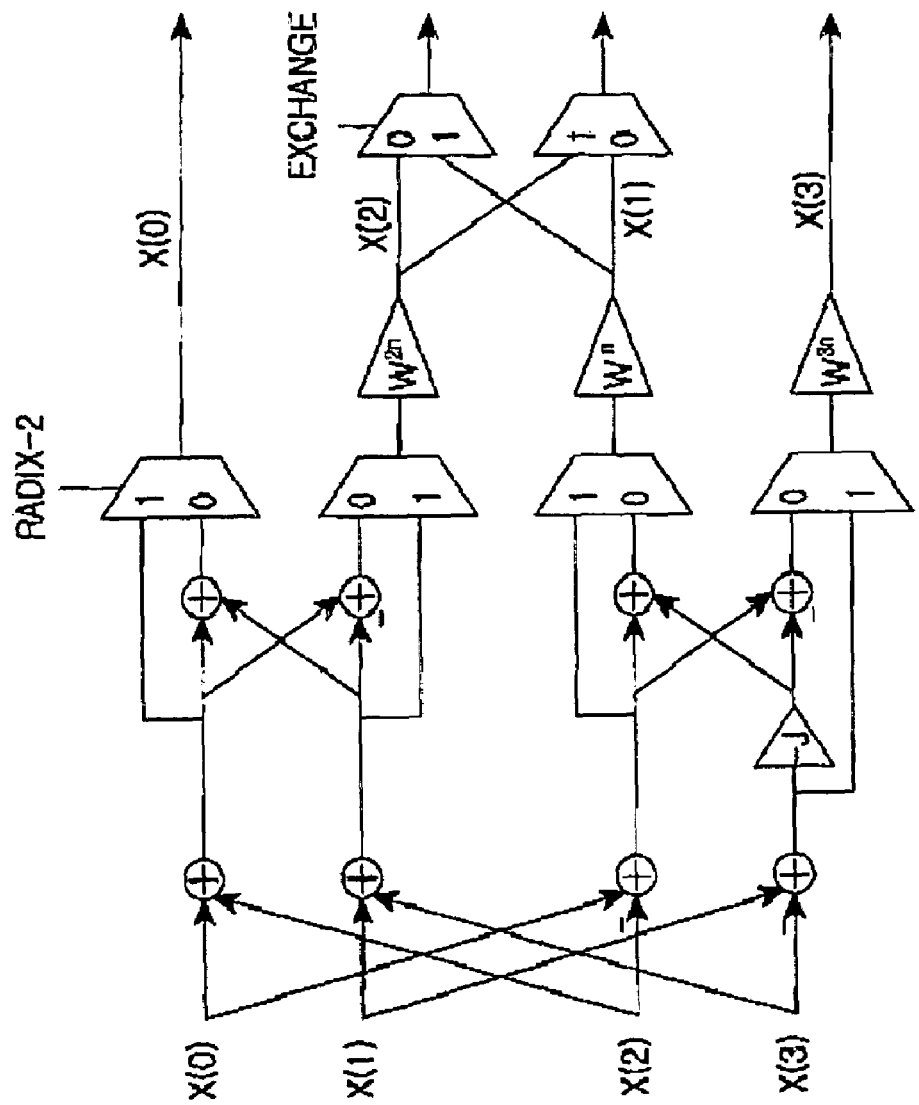
FIG. 6A is a block diagram illustrating a radix-4/radix-2 butterfly circuit used in the FFT processor of FIG. 4.
Figure 6B:
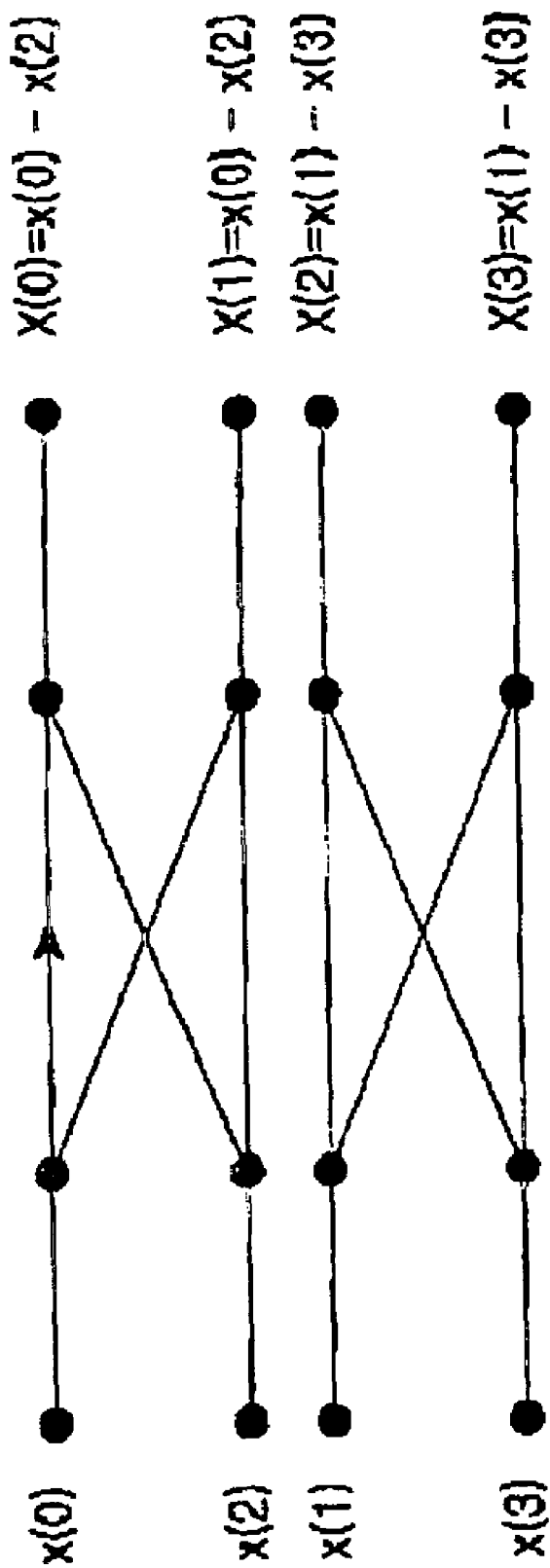
FIG. 6B is a diagram illustrating an equivalent butterfly pair for the radix-2 butterfly of FIG. 6A.

In the FFT processor, a radix-2 butterfly structure is not realized with a separate butterfly, but is realized by adding a data switching circuit to a radix-4 butterfly. This is illustrated in FIG. 6A. In FIG. 6A, one radix-4 butterfly and two radix-2 butterflies are realized through a multiplexer select signal 'Radix-2'. Referring to FIG. 6A, input data symbols x(0) and x(2) are applied to adders constituting one radix-2 butterfly, and input data symbols x(1) and x(3) are applied to adders constituting another radix-2 butterfly. The adders constituting the radix-2 butterflies each branch (or divide) their outputs into two outputs and provide one output to an input terminal of each multiplexer. Another branched output is added to or subtracted from an output from the other adders constituting the radix-2 butterfly, and provided to another input terminal of the multiplexer. Thereafter, as illustrated in the drawing, an output of each multiplexer is output as it is, or branched again and selected through other multiplexers. Such output values are mapped to an in-place address according to the present invention. This will be described in more detail below. An equivalent circuit diagram of FIG. 6A is illustrated in FIG. 6B. FIG. 6B illustrates a radix-2 butterfly pair equivalent to a radix-2 butterfly realized with a radix-4 butterfly circuit.

A description will now be made of a structure for performing continuous processing in a memory structure according to the present invention. As mentioned above in the description of the related art, a continuous processing structure proposed by R. Radhouane is a structure for a radix-2 algorithm. However, a structure proposed by the present invention is a structure for a mixed-radix algorithm mixed with a radix-4 algorithm. In addition, the conventional structure alternately performs a FFT calculation and DIT calculation. However, the structure proposed by the present invention performs only DIF calculation and performs continuous processing by simply controlling memory addressing.

In order to perform continuous processing as proposed by the present invention, a symbol to be newly decoded must be written in a position of a symbol to be decoded. Through the operation of reading a symbol to be decoded and writing a symbol to be newly decoded in the read position, read and write operations are simultaneously performed. In order to satisfy a radix-4 butterfly, each bank of a 4-bank memory must generate only one output. When calculation is completed through each stage, the symbols must be written in a read position. Thus, there is a necessity to generate addresses in this manner. The above method can be simply realized when only a radix-4 algorithm is used. Therefore, FIG. 7 illustrates an example of a 16-point FFT using only a radix-4 algorithm.

Figure 7:
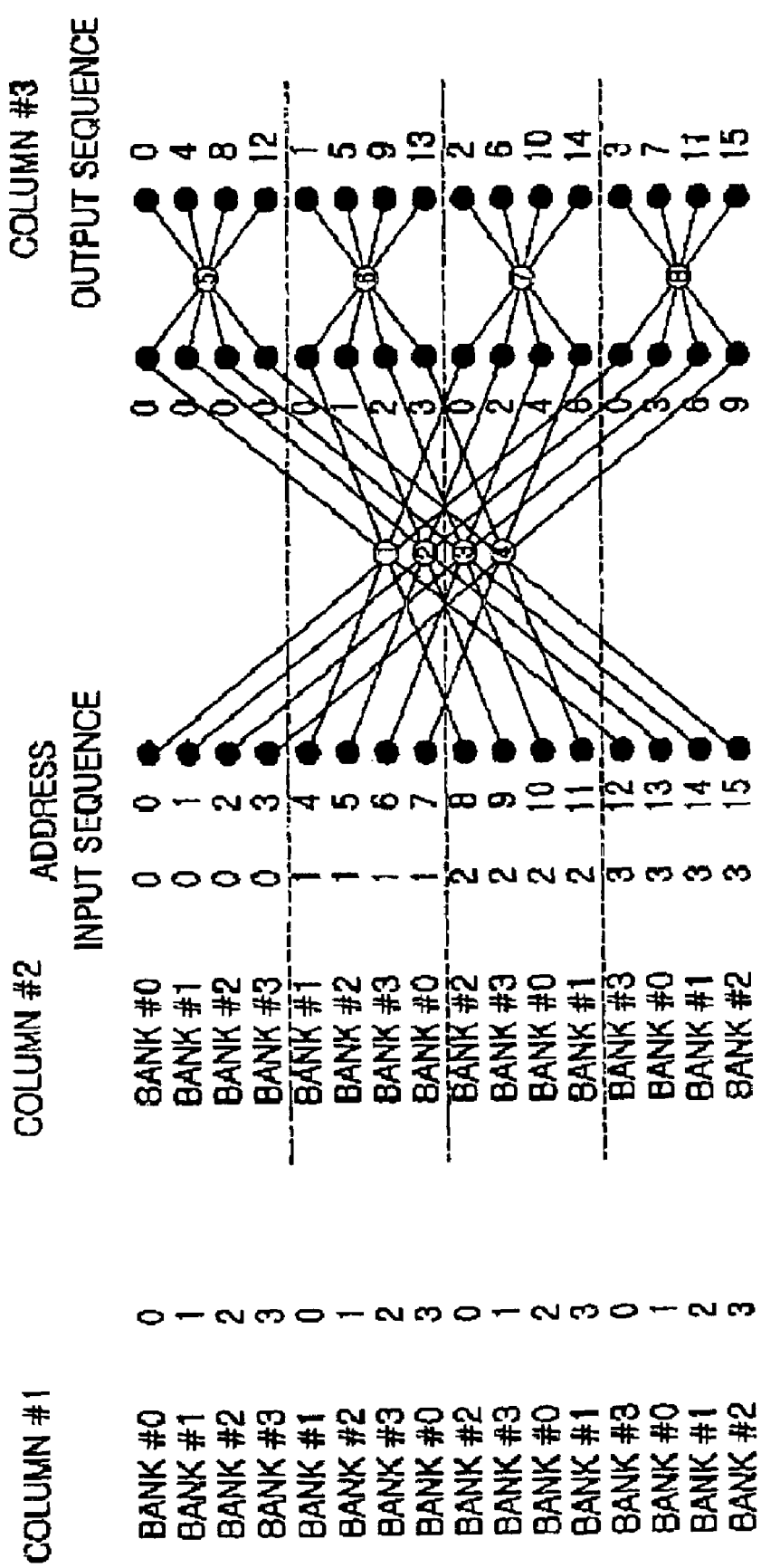
FIG. 7 is a diagram illustrating FFT calculation for realizing continuous processing for the case where only the radix-4 algorithm is used in FIG. 4.

In FIG. 7, a column #1 and a column #2 represent memory banks and addresses where data symbols are written, and a column #3 represents a digit reverse output sequence. In FIG. 7, input data symbols first received from the exterior are written in the banks and addresses of column #2. The input data symbols are subject to butterfly calculation 4 times in a first stage, and subject to butterfly calculation 4 times in a second stage. That is, in FIG. 7, (1) to (4) represent the 4 butterfly calculations performed in the first stage, and (5) to (8) represent the 4 butterfly calculations performed in the second stage. It is noted that in each butterfly calculation of each stage, one data symbol is read from each of 4 banks constituting one memory. In first butterfly calculation, data in an address 0 of a bank #0, data in an address 1 of a bank #1, data in an address 2 of a bank #2, and data in an address 3 of a bank #3 are read. Therefore, one data symbol is read from each bank. If 4 butterfly calculations are completed in this manner, 4 butterfly calculations are performed again in the second stage. The outputs calculated in this manner have the output sequence illustrated in column #3 of FIG. 7.

When the FFT calculation is performed in the above manner, an output is formed in a digit reverse sequence of column #3, and for a memory write position, a bank and an address of column #2 are maintained, since in-place calculation is performed. The calculation result is output in a sequential order through digit reverse addressing, and at the same time, when a next data symbol is received in a sequential order, new input data symbols are written in banks and addresses of column #1. Since a $0^{th}$ output of column #3 is written in an address 0 of a bank #0 in column #2, a $0^{th}$ symbol of new data for the next FFT calculation is written in the bank and address where the $0^{th}$ output is performed. Next, a $1^{st}$ output of column #3 is written in an address 1 of a bank #1 in column #2, and a $1^1$ symbol of new data is written in the position where the $1^{st}$ output is performed. A $2^{nd}$ output is written in an address 2 of a bank #2 in column #2, and a $2^{nd}$ symbol of the new data is written in the position where the $2^{nd}$ output is performed. When a new input is written in this manner, banks and address of column #1 are formed. After FFT calculation is performed on this, if the FFT calculation result is output in a sequential order and an input is written in the sequential order, it is restored through assignment of banks and addresses of column #2. Therefore, bank and address assignment of column #1 and bank and address assignment of column #2 are alternately performed.

If input and output can be simultaneously performed in a sequential order as stated above, continuous processing can be performed with only two memories such that while one memory performs calculation, the other memory performs input and output. At this point, FFT calculation must be performed at an operating frequency 2 times higher than an input/output operating frequency. This is because an FFT calculation clock cycle is larger than the number of FFT points as can be seen in Table 1. That is, for the radix-4 algorithm, the calculation clock cycle become longer from a 1024-point FFT, and for the mixed-radix algorithm of radix-4/radix-2 algorithms, the calculation clock cycle becomes longer from a 512-point FFT.

Figure 8A:
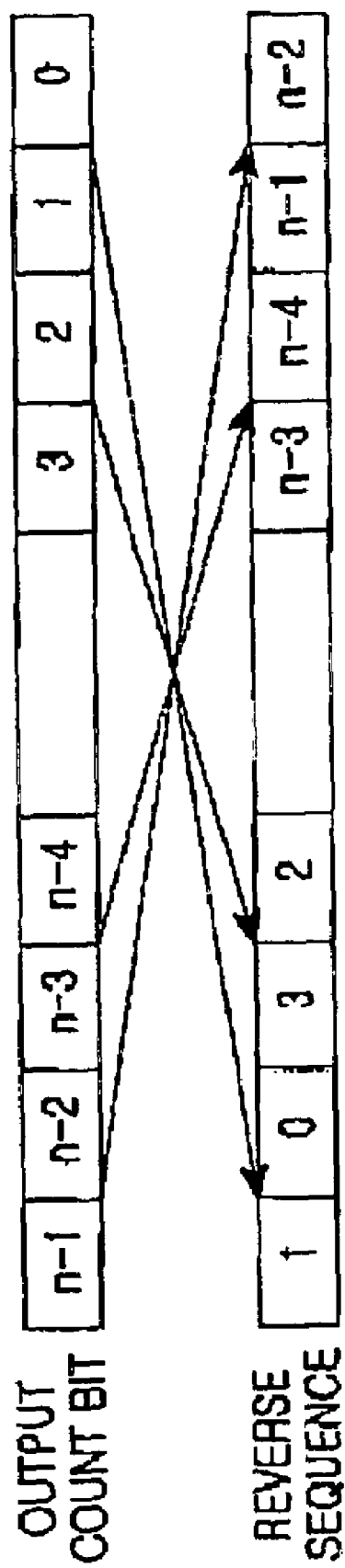
FIG. 8A is a diagram illustrating a digit reverse output sequence for the case where only a radix-4 algorithm is used for $4^n$-point FFT calculation.

The mixed-radix algorithm requires separate manipulation for sequential input/output for continuous processing. In a 32-point mixed-radix algorithm, outputs are provided as shown in a column #4 of FIG. 5. This has an asymmetric reverse form unlike a reverse sequence of the radix-4 algorithm in column #3 in FIG. 7. First, a description will be made of a digit reverse sequence for the case where only the radix-4 algorithm is used. A digit reverse sequence for a $2^n$-point FFT of the radix-4 algorithm is illustrated in FIG. 8A. Since n bits are required to count $2^n$ data symbols, an n-bit counter is used. In FIG. 8A, reverse is performed on the assumption that a $(n-1,n-2)^{th}$ bit pair, a $(n-3,n-4)^{th}$ bit pair, ..., a $(3,2)^{th}$ bit pair, and a $(1,0)^{th}$ bit pair each are one digit. Herein, the reverse performed in this manner is called "digit reverse." It can be understood from FIG. 8A that reverse is performed symmetrically on the basis of the center of the digits.

Figure 8B:
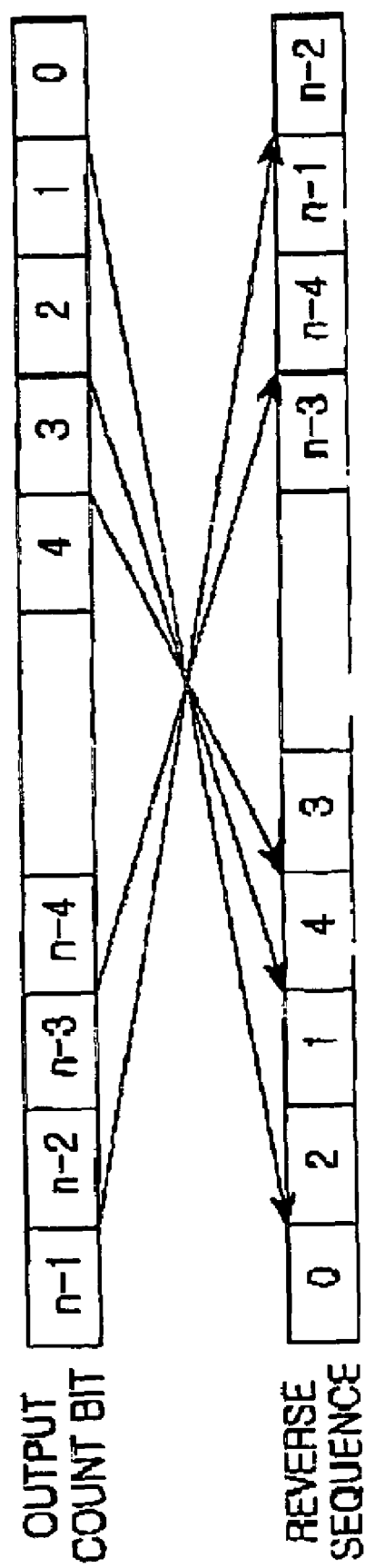
FIG. 8B is a diagram illustrating an asymmetric reverse output sequence for the case where a mixed-radix algorithm is used together with a radix-2 algorithm for $2^n$-point FFT calculation (where n=3, 5, 7, 9, . . . )
Figure 9:
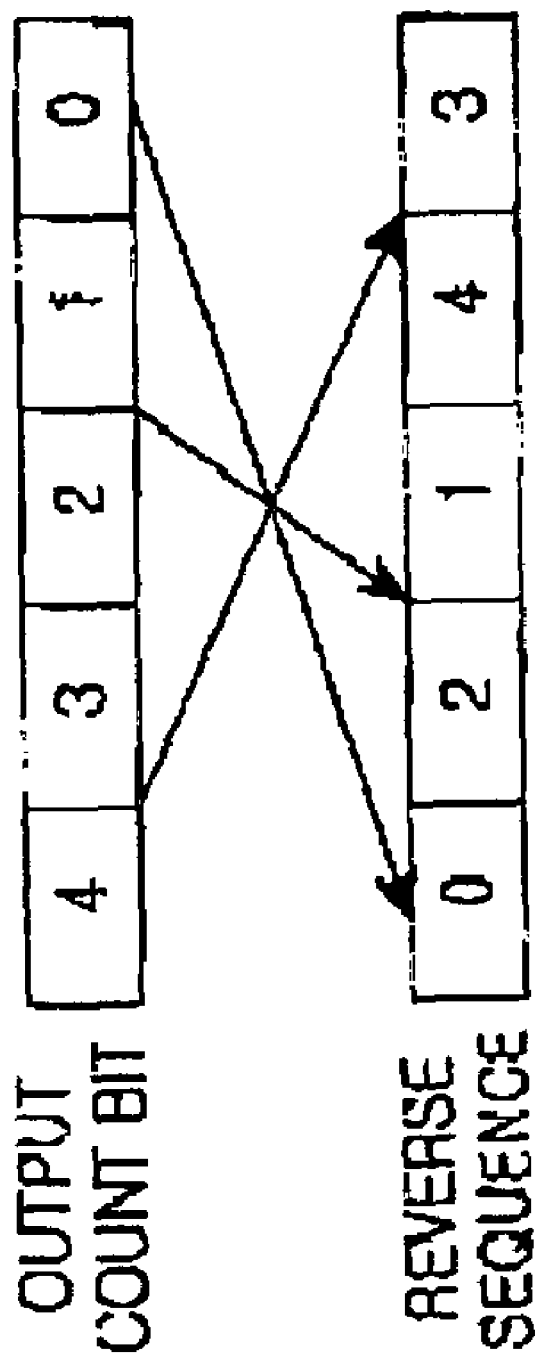
FIG. 9 is a diagram illustrating an asymmetric reverse output sequence for a column #4 of FIG. 5 which shows 32-point mixed-radix FFT calculation.
Figure 10:
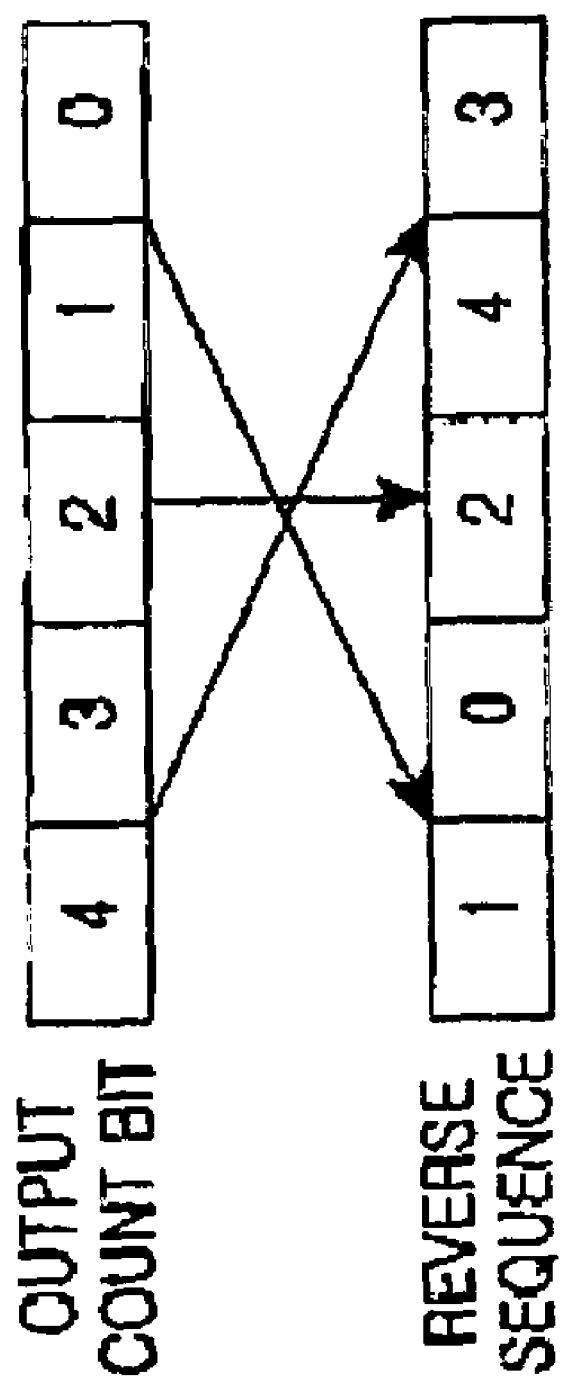
FIG. 10 is a diagram illustrating a symmetric reverse output sequence for a column #3 of FIG. 5 which shows 32-point mixed-radix FFT calculation.
Figure 11:
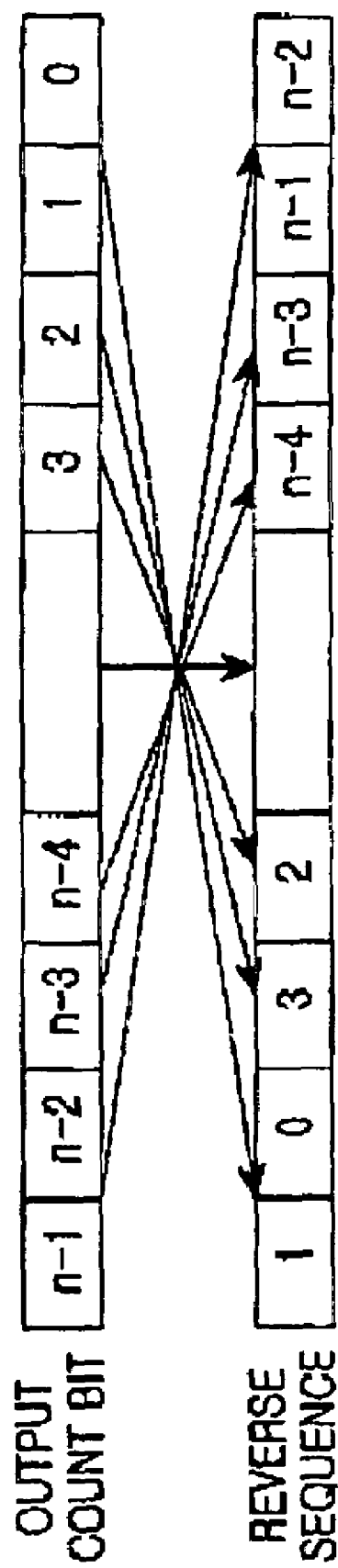
FIG. 11 is a diagram illustrating a symmetric reverse output sequence of a mixed-radix algorithm for $2^n$-point FFT calculation (where n=3, 5, 7, 9, . . . )

FIG. 8B illustrates a reverse sequence of a mixed-radix algorithm for a $2^n$-point FFT. Since the mixed-radix algorithm has as many points as the number of an odd numbered power of 2 such as 23, 25, 27 and 29 and the number of output count bits is an odd number such as 3, 5, 7 and 9, the mixed-radix algorithm cannot perform reverse with only a 2-bit digit like the radix-4 algorithm. The least significant bit must be separately reversed, and because of this, an asymmetric reverse form is provided. As an example of FIG. 8B, a column #4 of FIG. 5 corresponding to a $32(=2^5)$-point FFT has an asymmetric reverse form as shown in FIG. 9. When an asymmetric reverse output is provided, a structure in which banks and addresses of column #1 and column #2 are repeated cannot be formed like the structure of FIG. 7 composed of the radix-4 algorithm. Even in the mix-radix algorithm, in order to provide the structure in which column #1 and column #2 are repeated for continuous processing like the structure of FIG. 7 using only the radix-4 algorithm, outputs must have the symmetric reverse form. For that purpose, in the mixed-radix algorithm, data exchange is performed so that the asymmetric output sequence shown in column #4 of FIG. 5 is converted to have a symmetric output sequence shown in column #3, and as a result, a $32(=2^5)$-point symmetric reverse output sequence is shown in column #3 of FIG. 5, and can be generated as shown in FIG. 10. Describing a generalized $2^n$-point mixed-radix FFT, a symmetric reverse sequence of the output is illustrated in FIG. 11. Here, high 2 bits (n-1, n-2) and low 2 bits (1,0) are subject to digit reverse, and intermediate bits (n-3, n-4, ..., 3, 2) are subject to bit reverse. In conclusion, the original asymmetric reverse form of FIG. 8B is converted into the symmetric reverse form of FIG. 11 through the data exchange process.

Figure 12:
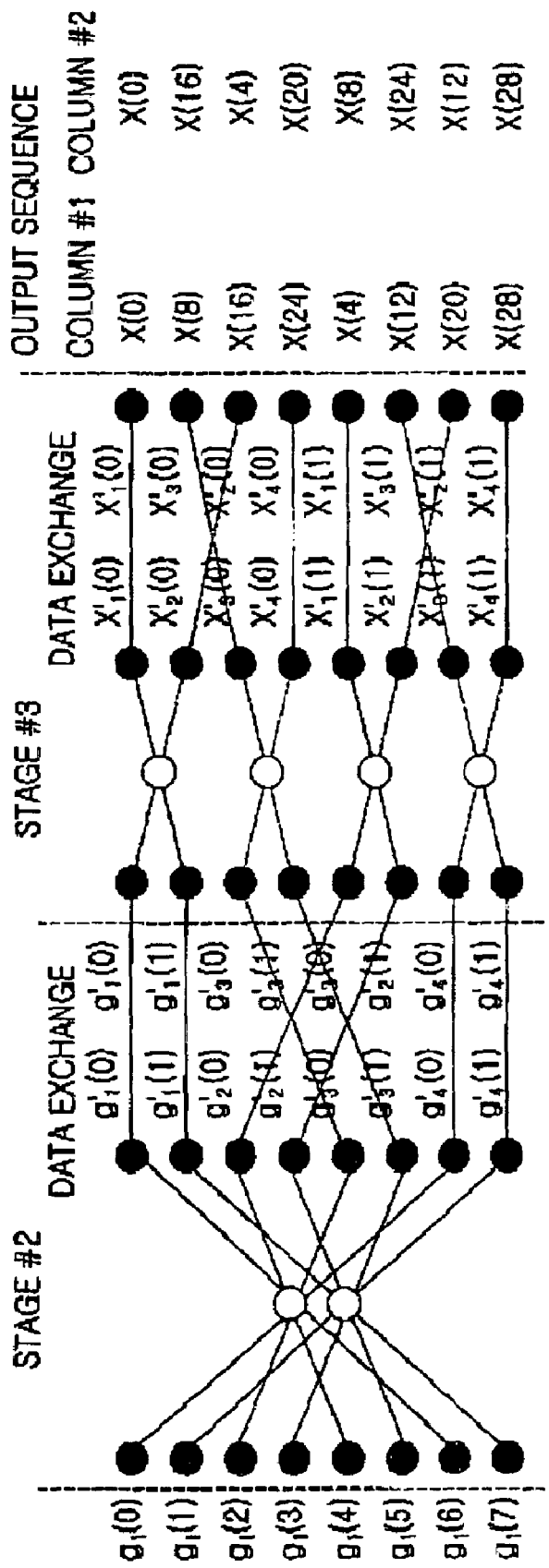
FIG. 12 is a diagram illustrating data exchange for generating a symmetric reverse output sequence for the column #3 of FIG. 5.

FIG. 12 illustrates a data exchange process for realizing the 32-pointsymmetric reverse sequence shown in FIG. 10 and column #3 of FIG. 5. FIG. 12 corresponds to an 8-point DFT part in a box drawn by a bold solid line of FIG. 5. As illustrated in FIG. 12, in stage #2, write positions of 2 second outputs g'2(n) and 2 third outputs g'3(n) of the radix-4 butterfly are exchanged, and also, in the stage #3, write positions of outputs X'2(n) and X'3(n) of the radix-2 butterfly pair are exchanged. When formed in this way, the symmetric reverse sequence is provided as illustrated in column #1 of FIG. 12. In FIG. 12, a column #2 shows an asymmetric reverse sequence for the case where the write positions are not exchanged. Such data exchange can be performed by controlling an 'Exchange' signal in the butterfly circuit of FIG. 6A. It is possible to form a symmetric reverse output sequence by exchanging second and third output write positions of a radix-4 butterfly in other stages except the first stage in all $2^n$-point FFTs (where n=1, 3, 5, 7, 9, . . . ) as well as the 32-point FFT given as an example, and exchanging second and third output write positions of two radix-2 butterflies in the last stage.

Finally, a description will be made of a method for generating a bank index in a mixed-radix algorithm. A bank index generation method according to the present invention generates bank indexes shown in column #1 and column #2 of FIG. 5. If an FFT length is $2^n$, a bank index and an address of each bank are generated by using an n-bit counter. The radix-4 algorithm described in the prior art section has $2^2$, $2^4$, $2^6$ or $2^8$ points. Therefore, the bank index i can be generated by performing modulo-4 addition on 2-bit digits. However, the mixed-radix algorithm has $2^3$, $2^5$, $2^7$ or $2^9$ points, so the number of input count bits becomes an odd number such as 3, 5, 7 and 9. Therefore, it is not possible to generate the bank index by simply performing modulo-4 addition on the 2-bit digits. In the mixed-radix algorithm of the present invention, when a digit of an input count bit is an odd number, a method for generating a bank index is performed through the following two processes. First, positions of the two most significant bits are exchanged. Second, the position-exchanged count values are divided into 2-bit digits from low bits, and modulo-4 addition is performed on the divided 2 bits. Then, one most significant bit remains, and a value calculated by performing modulo-4 addition on the remaining most significant bit is subject again to modulo-4 calculation.

Figure 13:
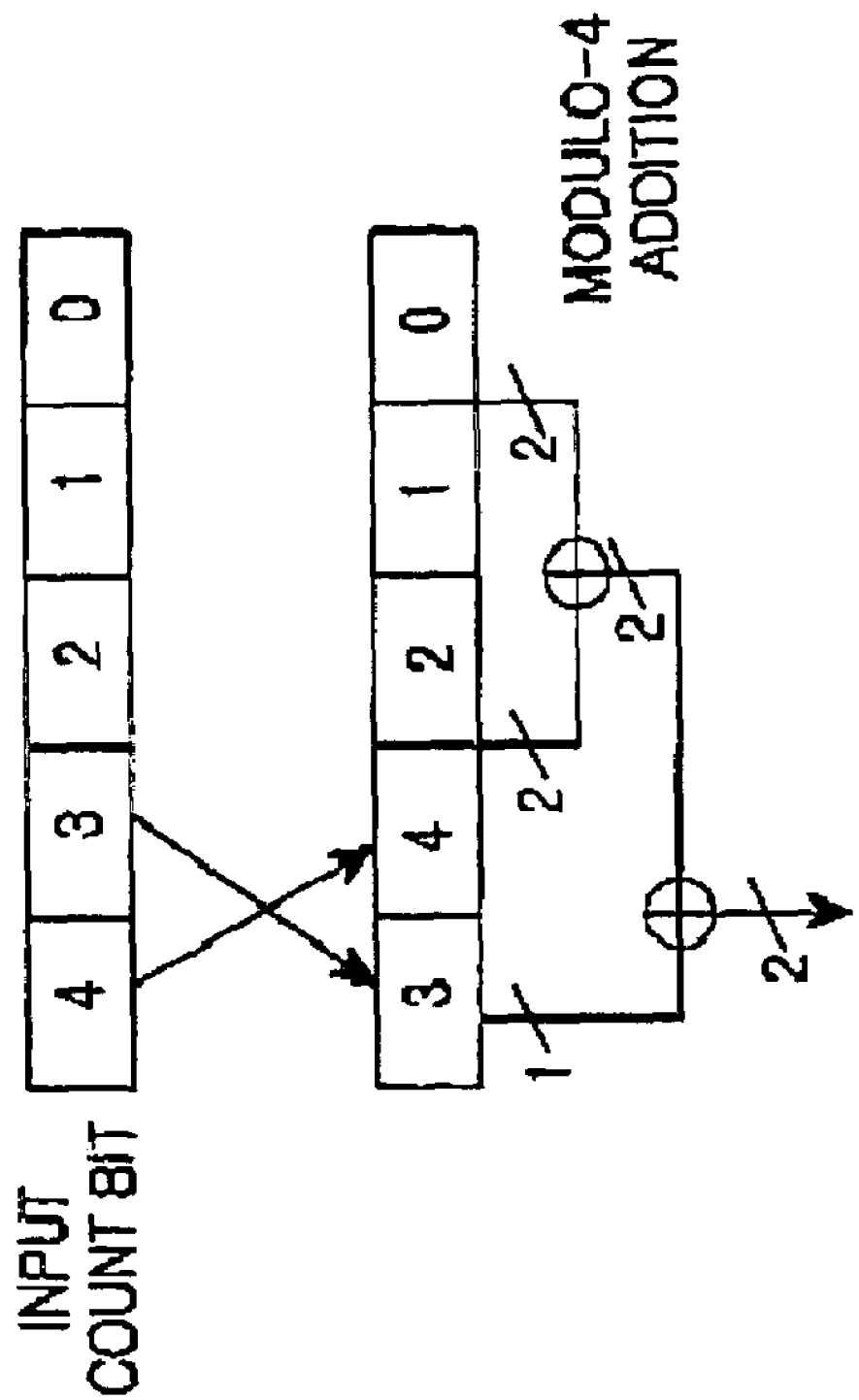
FIG. 13 is a diagram illustrating a bank index generation method of the 32-point mixed-radix FFT calculation of FIG. 5.

FIG. 13 illustrates a method for forming 2-bit digits and 1 bit of a 32(=$2^5$)-point FFT. If positions of the input count bits are exchanged and calculated in the above-mentioned manner, when modulo-4 calculation is performed, the finally remaining one bit corresponds to a third bit among input data count bits, and matching of bits being subject to modulo-4 addition calculation by the 2-bit digit from the low bits corresponds to (4,2) and (1,0). When the bank index is generated in this way, data can be read from other banks during FFT calculation, and further, the bank index sequence can be maintained when a change from the column #2 to the column #1 is made in FIG. 5.

Figure 14:
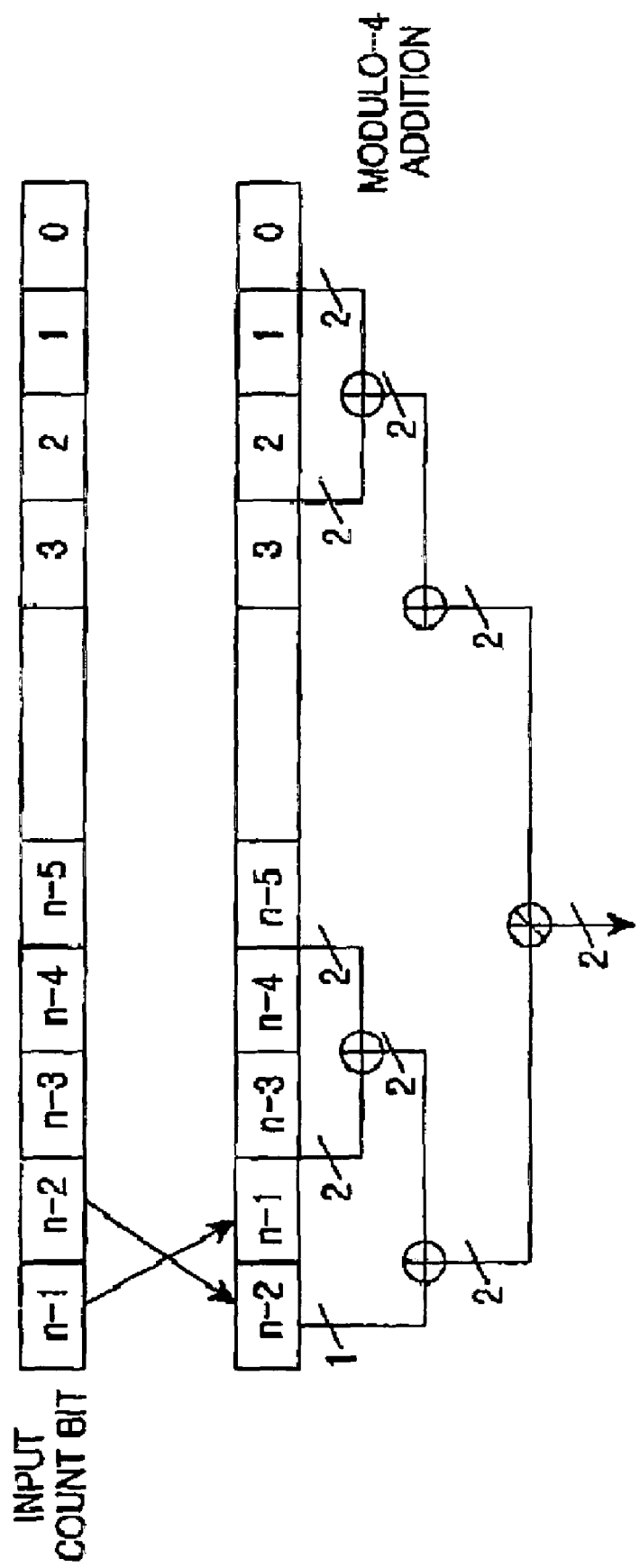
FIG. 14 is a diagram illustrating a mixed-radix bank index generation method for $2^n$-point FFT calculation (where n=3, 5, 7, 9, . . . ).

FIG. 14 illustrates a method for generating a bank index for a $2^n$-point mixed-radix FFT by generalizing the bank index generation method for a 32-point mixed-radix FFT. In FIG. 14, a position of one separate bit among input data count bits is an $(n-2)^{th}$ bit and the separate bit is included in performing modulo-4 addition on 2-bit digits.

As described above, the present invention can perform high-speed calculation by using a mixed-radix algorithm based on a radix-4 algorithm. In addition, the invention can minimize a size occupied by a memory by applying in-place calculation to the mixed-radix algorithm and performing continuous processing with 2 N-word memories each including 4 banks through simultaneous input and output.

Shown in Table 3 below is a comparison between a calculation cycle of the proposed FFT processor and a calculation cycle of the conventional FFT processor. It can be understood from Table 3 that compared with the conventional memory structure using the radix-2 algorithm, the proposed memory structure reduces its calculation cycle to ¼.

TABLE 3

| Structure | Clock Cycle | N = 2,048 | N = 4,096 |
|---|---|---|---|
| Conventional Structure | Radix $-2\frac{N}{2}\log 2N + 2$ | 11,266 | 24,578 |
| Proposed Structure | Radix $-4\frac{N}{4}\log 4N + 6$ | — | 6,150 |
| | Mixed – Radix(Radix – 4, Radix $-2)\frac{N}{4}\log 42N + 6$ | 3,078 | — |

In addition, when the present invention is compared with the conventional radix-4 algorithm-based mixed-radix FFT processor not using the multi-bank structure, the conventional FFT processor consumes a calculation cycle about 4 times longer than that of the proposed FFT processor. Besides, the conventional mixed-radix FFT processor that does not adopt the in-place algorithm and the simultaneous input/output structure, requires 4 N-word memories each comprised of 4 banks, and has a memory size two times larger than that of the proposed FFT processor that requires two N-word memories. Therefore, the present invention satisfies the high-speed calculation requirement and the low hardware complexity requirement, and thus can be simply applied to an OFDM or DMT system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A modulation apparatus using a mixed-radix fast Fourier transform (FFT), comprising:
    an input/output interface for selecting a memory for input/output among memories for input/output and FFT calculation, selecting one of four banks of the selected memory, and performing input and output on the selected bank;
    two N-word memories each having four banks used for input/output to the input/output interface and FFT calculation;
    a first data exchange for selecting a memory for FFT calculation among the memories for input/output to the input/output interface and FFT calculation, and connecting banks assigned to each butterfly input/output to 4 inputs of a butterfly calculation circuit for in-place calculation;
    a butterfly for performing a radix-4 butterfly and a radix-2 butterfly provided from the first data exchange with one circuit, and forming a symmetric reverse output;
    a second data exchange for selecting a memory for FFT calculation among the memories for input/output to the input/output interface and FFT calculation, and connecting banks assigned to each butterfly input/output to four outputs of a butterfly calculation circuit for in-place calculation; and
    an address generator for generating a bank index and an address for performing in-place calculation in a multi-bank memory structure.

2. The modulation apparatus of claim 1, wherein the butterfly is a radix-4/2 butterfly calculation circuit capable of simultaneously performing sequential input and output by forming a symmetric reverse output sequence by exchanging outputs of a radix-4 butterfly and two radix-2 butterflies, so that continuous processing can be performed with the two N-word memories each including four banks.

3. The modulation apparatus of claim 1, wherein the in-place algorithm is determined by modifying an in-place algorithm of a radix-4 algorithm-based multi-bank memory structure.

4. The modulation apparatus of claim 1, wherein the in-place algorithm separately includes an $(n-2)^{th}$ bit in modulo-4 addition during $2^n$-point calculation in generating a bank index.

5. A modulation apparatus using a mixed-radix fast Fourier transform (FFT), comprising:
   two memories each having four banks, for writing input symbols or FFT-calculated symbols;
   a butterfly for performing butterfly calculation in a radix-4 mode or a radix-2 mode according to the number of symbols output from the memories, and outputting the calculated values in a symmetric reverse;
   a first data exchange for reading one symbol from each bank of one of the memories and outputting the read symbol to the butterfly;
   a second data exchange for matching calculated symbols output from the butterfly so that the symbols are written in the same addresses as addresses where the symbols were read from the first data exchange; and
   an address generator for controlling an output of the second data exchange so that when a symbol read from the first data exchange is output through the second data exchange after being calculated, a bank and an address where the symbol was read from the first data exchange are identical to an output bank and an output address of the second data exchange.

6. The modulation apparatus of claim 5, further comprising an input/output interface for performing interfacing between input/output data and the two memories.

7. The modulation apparatus of claim 5, wherein the butterfly has a radix-4 butterfly structure and is designed so that when radix-2 calculation is required, two radix-2 calculations are performed through a multiplexer included in the butterfly.

8. The modulation apparatus of claim 5, wherein for symmetric reverse of the butterfly, a binary output count value determined by the total number of symbols being subject to the butterfly calculation is symmetrically converted into an address by the 2 bits.

9. The modulation apparatus of claim 8, wherein when a digit of the binary output count value is an odd number, an address is determined by performing symmetrical conversion on the basis of a center bit of the digit.

10. The modulation apparatus of claim 5, wherein the address generator determines a bank with a value determined by performing modulo-4 calculation on a binary input count bit value corresponding to the calculated symbol.

11. The modulation apparatus of claim 10, wherein the address generator, when a digit of the binary input count bit is an odd number, determines a bank by exchanging positions of two most significant bits, performing modulo-4 calculation by the low two bits, and then performing modulo-4 calculation on the position-exchanged most significant bits.

* * * * *